(12) United States Patent
Cantor et al.

(10) Patent No.: US 12,411,031 B2
(45) Date of Patent: Sep. 9, 2025

(54) ELECTRODE ASSEMBLY

(71) Applicants: SENTEC LTD, Cambridge (GB); SENSUS SPECTRUM LLC, Morrisville, NC (US)

(72) Inventors: Michael Cantor, Cambridge (GB); Andrew Dames, Cambridge (GB); Matthew Price, Cambridge (GB); Paul Dunaway, Cary, NC (US); Mike Zimmerman, Uniontown, PA (US); James Evett, Winslow (GB)

(73) Assignees: SENSUS SPECTRUM LLC, WILMINGTON, New Castle, DE (US); SENSUS USA INC., WILMINGTON, New Castle, DE (US)

( * ) Notice: Subject to any disclaimer, the term of this patent is extended or adjusted under 35 U.S.C. 154(b) by 439 days.

(21) Appl. No.: 17/636,961

(22) PCT Filed: Aug. 7, 2020

(86) PCT No.: PCT/GB2020/051898
§ 371 (c)(1),
(2) Date: Feb. 21, 2022

(87) PCT Pub. No.: WO2021/032948
PCT Pub. Date: Feb. 25, 2021

(65) Prior Publication Data
US 2022/0357189 A1 Nov. 10, 2022

(30) Foreign Application Priority Data
Aug. 21, 2019 (GB) .................................. 1911971

(51) Int. Cl.
*G01F 1/58* (2006.01)
*G01F 1/60* (2006.01)

(52) U.S. Cl.
CPC ................ *G01F 1/584* (2013.01); *G01F 1/60* (2013.01)

(58) Field of Classification Search
CPC .................................. G01F 1/584; G01F 1/60
(Continued)

(56) References Cited

U.S. PATENT DOCUMENTS 7,155,983 B2   1/2007   Wehrs et al.
7,472,605 B2   1/2009   Knill et al.
(Continued)

FOREIGN PATENT DOCUMENTS

IT    201800002753       8/2019
WO    2019/159125 A1    8/2019

OTHER PUBLICATIONS

Notification concerning transmittal (Form PCT/IB/326) of international preliminary report on patentability (Form PCT/IB/373) including Written opinion od the international searching authority (Form PCT/ISA/237), application PCT/GB2020/051898, filed Aug. 7, 2020, 8 pages total.
(Continued)

*Primary Examiner* — Peter J Macchiarolo
*Assistant Examiner* — John M Royston
(74) *Attorney, Agent, or Firm* — Francis J. Maguire; WARE FRESSOLA MAGUIRE & BARBER LLP

(57) ABSTRACT

An electrode assembly for an electromagnetic flow meter is disclosed. The electrode assembly comprises a housing, which may be a flow tube of the electromagnetic flow meter, having a passage between first and second ends, an electrode comprising a plug of porous material, for example formed of porous graphite, at least partially disposed within the passage proximate the first end, and an electrically-conductive polymer connector at least partially disposed within the passage and in direct contact with the electrode.

27 Claims, 17 Drawing Sheets

(58) Field of Classification Search
USPC .................................................... 73/861.12
See application file for complete search history.

(56) References Cited

U.S. PATENT DOCUMENTS

| | | |
|---|---|---|
| 2007/0234821 A1 | 10/2007 | Wehrs et al. |
| 2010/0018326 A1* | 1/2010 | Lin ..................... G01F 1/8454 |
| | | 73/861.354 |
| 2010/0313675 A1 | 12/2010 | Goegge et al. |
| 2017/0350738 A1 | 12/2017 | Heizenroeder |
| 2018/0216978 A1* | 8/2018 | Dames .................. G01F 15/18 |
| 2020/0393282 A1* | 12/2020 | Schmid ................. G01F 15/16 |
| 2021/0116273 A1* | 4/2021 | Savini ..................... G01F 1/60 |

OTHER PUBLICATIONS

EPO Communication pursuant to Article 94(3) EPC, dated Mar. 20, 2023, application No. 20 754 823.1-1001, 5 pages.
Notification of Transmittal of the International Search Report and the Written Opinion of the International Searching Authority, International Application No. PCT/GB2020/051898, mailed Oct. 22, 2020, 11 pages.
Machine translation (Espacenet) of Foreign Document Cite No. 2 (IT201800002753A1), 32 pages.
Seach Report associated with first office action dated Nov. 26, 2024, United Arab Emirates Ministry of Economy, Patent Application No. P6000277 filed Feb. 16, 2022, 2 pages.
Office Action Summary for first office action dated Nov. 26, 2024, United Arab Emirates Ministry of Economy, Patent Application No. P6000277 filed Feb. 16, 2022, 6 pages.

* cited by examiner

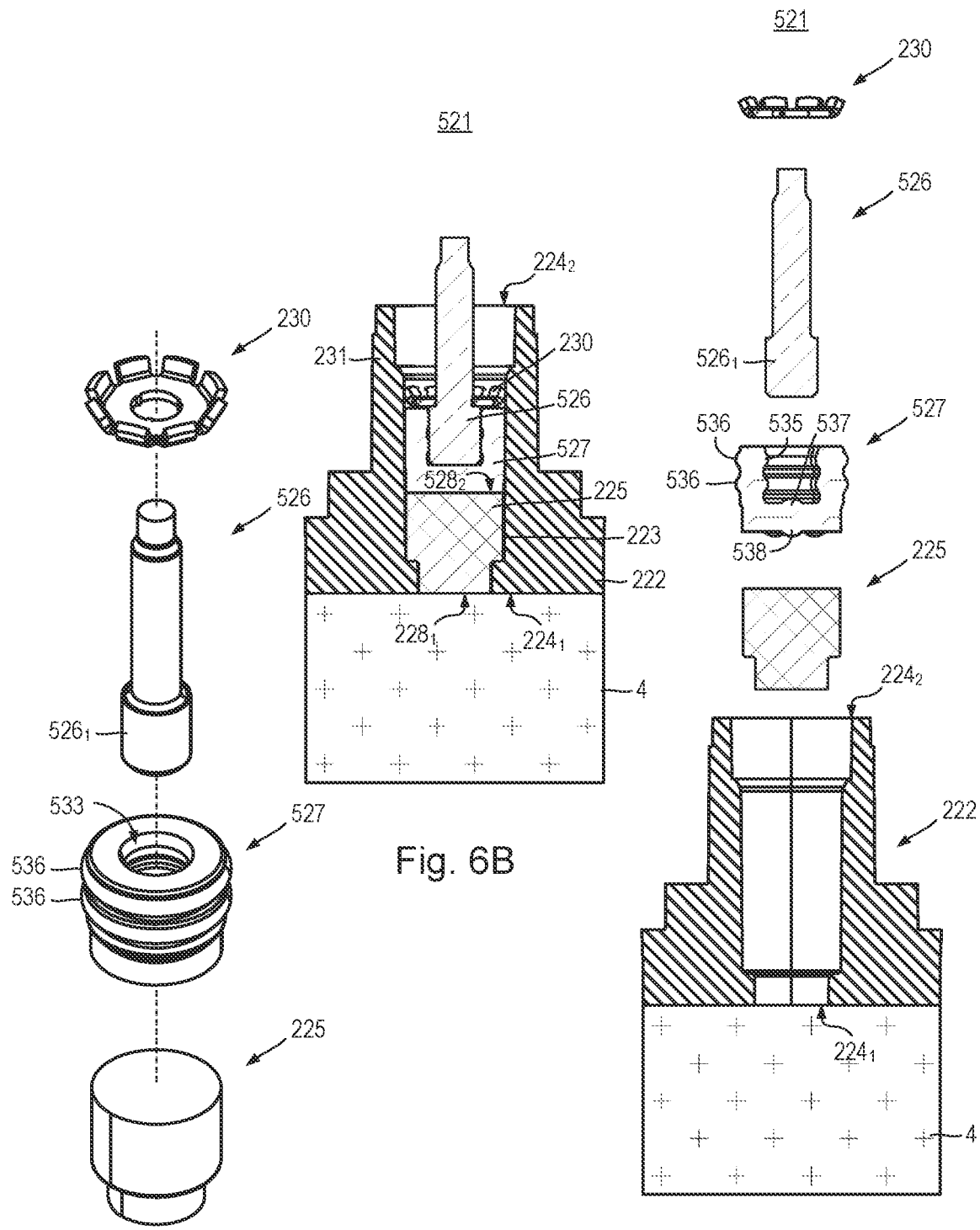

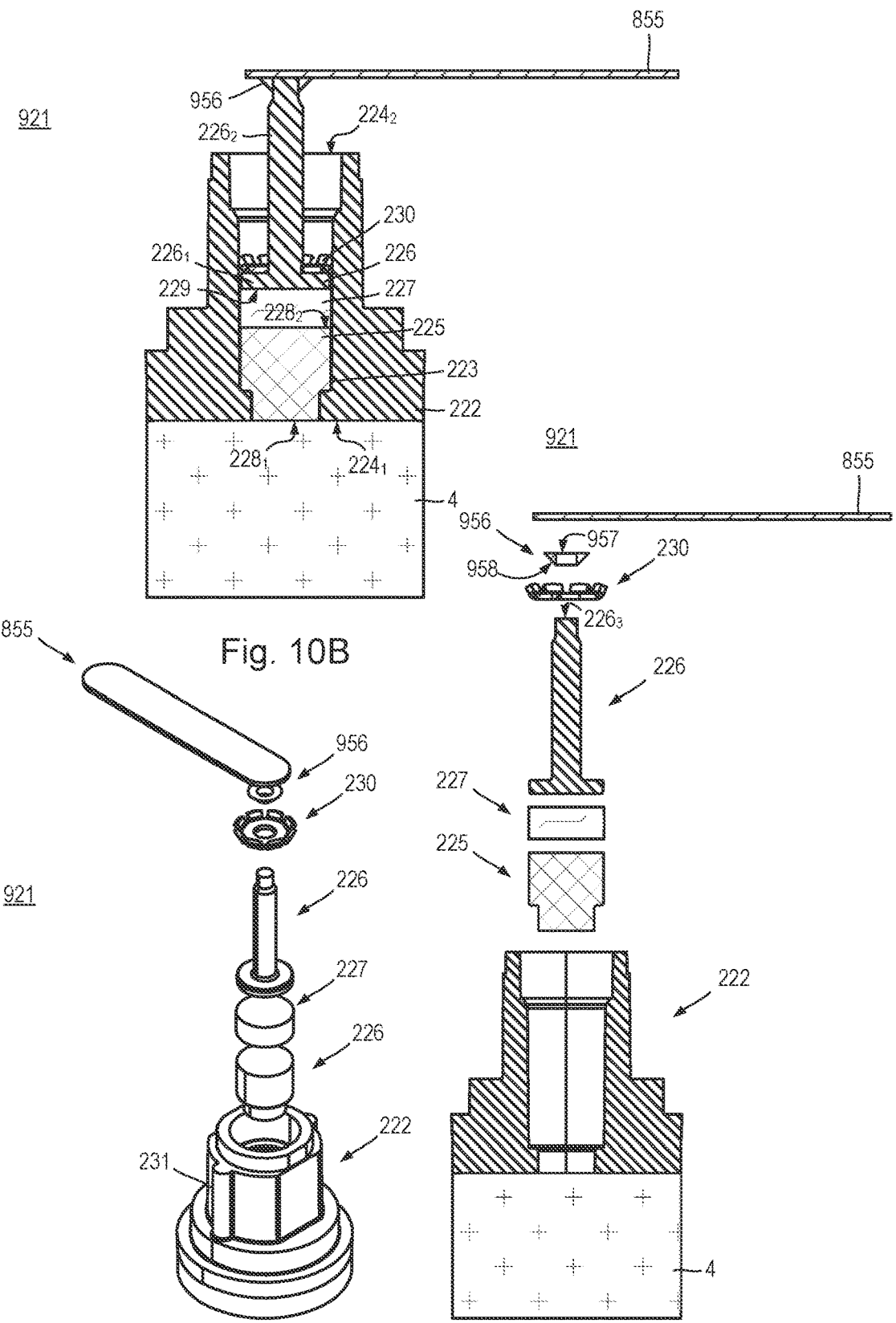

ELECTRODE ASSEMBLY

BACKGROUND

The present invention relates to an electrode assembly for an electromagnetic flow meter and to an electromagnetic flow meter.

Electromagnetic flow meters (also referred to as "magnetic flow meters" or even "mag flow meters") are known.

Electromagnetic flow meters can use an electrode assembly comprising a silver chloride-coated silver electrode and a porous graphite plug through which water permeates from the flow channel to reach and come into contact with the silver chloride-coated silver electrode. The plug of graphite is used to protect the electrode. As described in U.S. Pat. No. 7,472,605 B2, a silver chloride/silver electrode can exhibit low noise energy at frequencies below 5 Hz. Using silver electrodes can increase the cost of the flow meter. Furthermore, silver chloride may degrade over a period of time in water having a very low concentration of chloride ions, e.g., desalinized water.

Inert materials, such as gold and platinum, can be used as a low-noise electrode, but are even more expensive. Cheaper metals, however, tend to exhibit more noise and generate unpredictable voltages due to electrochemical reactions. Electrodes formed from electrically-conductive polymers have also been tried and reference is made to U.S. Pat. No. 7,155,983 B2 and WO 2019/159125 A1.

SUMMARY

According to a first aspect of the present invention there is provided an electrode assembly for an electromagnetic flow meter. The electrode assembly comprises a housing having a passage between first and second ends, an electrode comprising a plug (or "piece" or "block") of porous material (for example, which comprises or is formed from graphite, or any porous material predominately formed of carbon, or a porous material made with surfaces of electrochemically inert material such as gold or platinum or carbon) at least partially disposed within the passage proximate the first end and an electrically-conductive polymer connector at least partially disposed within the passage and in direct contact with the electrode (which may also serve as fluid-tight seal).

Using an electrically-conductive polymer connector (i.e., an electrically-conductive part or piece which can be used to provide an electrical connection to the electrode) can help to reduce or even avoid galvanic effects in the electrode-connector interface and, thus, aid reduction in electrical noise energy and/or unwanted voltages.

The electrode may at least partially be disposed outside the passage, for example, extend or protrude from the passage. The electrically-conductive polymer connector may at least partially be disposed outside the passage, for example, extend or protrude from the passage.

The plug of porous material may include a blind-hole, e.g., a central blind-hole in a connector-facing end, which can help deformation of the electrically-conductive polymer connector and, thus, increase sealing. The plug of porous material may include one or more through-holes, e.g., a central through-hole, between its ends which can help increase wetting throughout the volume of the electrode.

The electrode may have a porosity of greater than or equal to 1%, greater than or equal to 5%, greater than or equal to 10%, greater than or equal to 15%, greater than or equal to 20%, and less than or equal to 30% and less than or equal to 40%. The electrode may have a porosity of between 1 and 40%, between 5% and 40% or between 10 and 30%. Increasing porosity of the electrode, particularly a graphite electrode, can help to reduce noise.

A substantial number of pores in the electrode may have diameters in the range of 0.001 µm to 10 µm. Thus, the surface area provided by the electrode may lie in a range 5 to 50 $m^2$ per $cm^3$ of electrode. The surface area provided by the electrode may be greater than or equal to 10 $m^2g^{-1}$, greater than or equal to 20 $m^2g^{-1}$ or greater than or equal to 100 $m^2g^{-1}$ of electrode material. The density of the porous graphite electrode or the carbon-based porous electrode may be greater than or equal to 1 $gcm^{-3}$ and less than or equal to 2.4 $gcm^{-3}$.

The electrode may have a volume greater than or equal to 7 $mm^3$, greater than or equal to 25 $mm^3$, greater than or equal to 100 $mm^3$, greater than or equal to 150 $mm^3$, greater than or equal to 200 $mm^3$, and less than or equal to 1,000 $mm^3$. The electrode may have a volume between 7 $mm^3$ and 1,000 $mm^3$, between 25 $mm^3$ and 200 $mm^3$, or between 100 $mm^3$ and 150 $mm^3$. Increasing the volume of the electrode can reduce noise and increase measurement repeatability.

The noise density of a pair of electrodes at 1 Hz may be less than or equal to 90 nV/sqrt(Hz), or less than or equal 60 nV/sqrt(Hz), or less than or equal 30 nV/sqrt(Hz). The noise density of a pair of electrodes at 1 Hz may be greater than or equal to 5 nV/sqrt(Hz). The noise density of a pair of electrodes at 1 Hz may be between 5 nV/sqrt(Hz) to 90 nV/sqrt(Hz).

1 Hz may be the frequency at which the magnetic field is reversed.

A fluid-facing (or "front") face of the electrode (i.e., the face closest to the first end) may have a diameter greater than or equal to 2 mm, greater than or equal to 3 mm, greater than or equal to 4 mm, or greater than or equal to 5 mm. The electrode may have a diameter between 2 and 5 mm or between 3 and 4 mm.

The electrode may have a length (i.e., distance between the front face and back face) greater than or equal to 1 mm, greater than or equal to 2 mm, greater than or equal to 3 mm, greater than or equal to 5 mm, greater than or equal to 10 mm. The electrode may have a length between 1 and 10 mm, between 2 and 5 mm, or more between 3 and 5 mm.

The electrode may be insert-moulded or assembled in the housing, which may be a flow tube. The flow tube may have a nominal diameter ranging from DN15 to DN100 inclusive. The flow tube may have a nominal size ranging from 15 mm (⅝-inch nominal size) to 100 mm (4-inch nominal size) inclusive.

The electromagnetic meter may be a fiscal meter.

The electrode front face may be aligned with the inside face of the flow tube within ±0.5 mm, or may be flush or sub flush by less than or equal to 0.3 mm with the inside face of the flow tube.

The electrically-conductive polymer connector may provide a seal disposed within the passage, interposed between the electrode and a further connector (which may comprise or be predominantly formed of a non-noble metal, such as copper or other transition metal, or an alloy comprising a non-noble metal, e.g., a transition metal), and is arranged to electrically connect the electrode and the further connector and to provide a fluid-tight seal in the passage between the electrode and the further connector.

The further connector may have a coating, for example, of a noble metal, such as gold. The thickness of the coating may be less than 1 µm, less than to 10 µm or less than 50 µm. The thickness of the coating may be between 0.2 µm and 50 µm or between 0.5 µm and 20 µm.

The electrically-conductive polymer connector may be disposed within the passage in direct electrical contact with the electrode and the electrode assembly may further comprise a seal (such as an 'O'-ring which need not be electrically conductive) to provide a fluid-tight seal between the first end of the passage and a non-wetted section of the flow meter. The seal may be at least partially disposed around a length of the connector.

The electrically-conductive polymer connector may comprise or be predominantly formed from an elastomer. The electrically-conductive polymer connector may abut the electrode. The electrically-conductive polymer connector may abut the further connector. The electrically-conductive polymer connector may be compressed. The electrically-conductive polymer connector may be compressed against the electrode. The electrically-conductive polymer connector may be compressed between the electrode and the connector. The compression force may be at least 20 N. This can help to reduce contact resistance. The electrically-conductive polymer connector may comprise or be predominantly formed from a thermoset or thermoplastic or elastomer or a combination of the materials herein described. The electrically-conductive polymer connector may be adhered or molded to the further connector.

The electrically-conductive polymer connector may be shaped so as to promote spreading in a transverse direction when compress in a direction along the passage. The electrically-conductive polymer connector may be arranged to withstand a pressure of at least 6.5 MPa. The electrically-conductive polymer connector may comprise or is predominantly formed from silicone. The electrically-conductive polymer connector may comprise or may be predominantly formed from ethylene propylene diene monomer rubber. The electrically-conductive polymer connector may comprise particles of electrically-conductive material. The electrically-conductive material may be carbon. The electrically-conductive polymer connector may comprise carbon black. The electrically-conductive polymer connector may comprise carbon nanotubes. The electrically-conductive material may be silver. Resistance of the electrically-conductive polymer connector may be less than or equal to 1 k$\Omega$, less than or equal to 100$\Omega$, or less than or equal to 10$\Omega$. Resistance of the electrically-conductive polymer connector may between 5 and 1 k$\Omega$, between 5 and 100$\Omega$ or between 5 and 10$\Omega$.

The electrically-conductive polymer connector may be seated in the electrode.

According to a second aspect of the present invention there is provided an electrode assembly for an electromagnetic flow meter. The electrode assembly may comprise a housing having a passage between first and second ends, an electrode disposed within the passage proximate the first end, a first connector (or "further connector") disposed within the passage, and an electrically-conductive polymer connector (or "electrically-conductive polymer seal") disposed within the passage interposed between the electrode and the first connector and arranged to electrically connect the electrode and the first connector and to provide a fluid-tight seal in the passage between the electrode and the first connector.

According to a third aspect of the present invention there is provided an electromagnetic flow meter comprising a flow tube having a flow passage, first and second electrode assemblies of the first aspect disposed on opposite sides of the flow tube and arranged such that respective electrode are in fluid communication with the flow passage; and a magnetic field source for providing a magnetic field across the flow passage between the electrodes.

The first connector or the electrically-conductive polymer connector may be directly connected to metrology circuitry. For example, the metrology circuitry may comprise a printed circuit board (PCB) and the connector may be mounted on the PCB. Alternatively, the first connector or the electrically-conductive polymer connector may be connected to the PCB by wire(s) or flexible circuit sheet(s) and may include a connector (e.g., plug and socket).

The flow tube may provide respective housings for the first and second electrode assemblies.

The magnetic field source may comprise a length of remanent magnetic material and a coil wound around at least a portion of the length of remanent magnetic material.

The electromagnetic flow meter may further comprise circuitry connected to the connectors arranged to perform a flow measurement.

According to a fourth aspect of the present invention there is provided a magnetic flow meter, which comprises at least one conductive polymer interconnect, at least two electrodes, a flow conduit, and a magnetic field source.

The conductive polymer may form an electrical interconnect with an electrode and a conductive metal. The conductive polymer interconnect may form a least part of the electrical interconnect between the conductive liquid to be measured and an electrical circuit. The compliant conductive material may abut the electrode. The conductive polymer interconnect may be compliant. The compliant conductive material may make a seal. The compliant conductive material may make a seal that stops the conductive liquid reaching one side of conductive polymer interconnect. The compliant conductive material may be compressed. The compliant conductive material may be compressed against an electrode. The compliant conductive polymer may be conductive rubber. The compliant conductive material may be compressed between an electrode and a conductive component. The compliant conductive polymer interconnect may be compressed and sized to enable a seal to be made which resists the flow meter's operational pressure. The compliant conductive material may be compressed and sized to enable a seal to be made which resists the flow meter's burst pressure requirement. The compliant conductive material may be compressed using a screw or using a press operation and a "star lock" washer or any form of barbs, or plug retained by welding or heat staking or adhesive. The compliant conductive material may be compressed to a level which enables a seal to be made but will maintain the integrity of the electrode. The electrode may be made from porous graphite.

Certain embodiments comprise an electrically conductive polymer that provides electrical continuity in addition it may provide a fluid tight seal between an electrode and the electronics in a magnetic flow meter.

Silver, silver-chloride electrodes which are used as electrodes with a porous graphite shielding plug in a magnetic flow water meter can be replaced with a cheaper graphite electrode and electrically-conductive polymer that can be injection moulded or transfer moulded or extruded or made from sheet or rod.

The application of magnetic flow water meters can be extended to water supplies with low chloride ion content, as this causes the performance of meters with silver, silver chloride pins to degrade.

BRIEF DESCRIPTION OF THE DRAWINGS

Certain embodiments of the present invention will now be described, by way of example, with reference to the accompanying drawings, in which:

FIGS. 6A, 6B and 6C are exploded perspective, cross-sectional and exploded cross-sectional views, respectively of a fifth electrode assembly which includes a housing, an electrode, a polymer piece which serves as a seal and an interconnect and which is cup-shaped having two inner and two outer circumferential ribs, a further connector and a retainer;

FIGS. 10A, 10B, and 10C are exploded perspective, cross-sectional and exploded cross-sectional views, respectively of a ninth electrode assembly which includes a housing, an electrode, a polymer piece which serves as a seal and an interconnect, a further connector in the form of a conductive plastic pin, a flexible circuit connected to the connector using a conductive adhesive or a sprung connector, and a retainer;

DETAILED DESCRIPTION OF CERTAIN EMBODIMENTS

Electromagnetic Flow Meter 1

Figure 1:
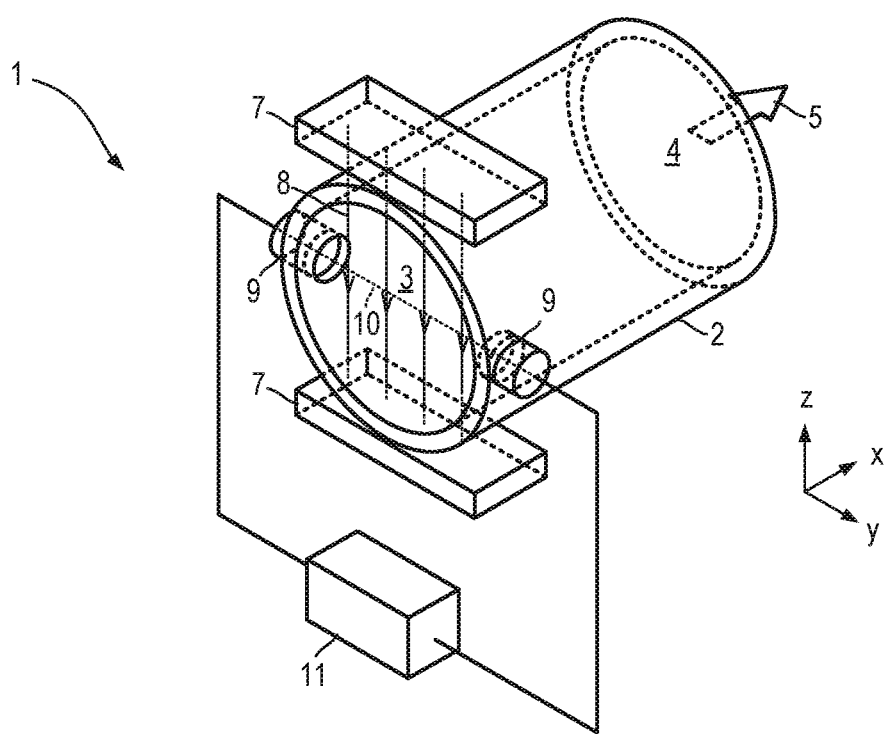
FIG. 1 is a schematic diagram of an electromagnetic flow meter.

Referring to FIG. 1, a simplified view of an electromagnetic flow meter 1 is shown.

The flow meter 1 includes a flow tube 2 defining a flow passage 3 for a fluid 4 having a direction of flow 5 (in this case, along the x-axis), a magnetic field source in the form of a coil (not shown), first and second poles 7 for providing a transverse magnetic field 8 (in this case, along the z-axis) to the flow passage 3 from the coil (not shown) and a pair of electrodes 9 which face each other on opposite sides of the flow tube 2 and which are exposed to the flow passage 3 so as to be in contact with the fluid 4 when it flows through the flow passage. The electrodes 9 are arranged along a line 10 (in this case, along the y-axis) which is perpendicular to both the direction of flow 5 and the magnetic field 8. The flow tube 2 comprises or is lined with an electrically-insulating material, such as a suitable plastic.

When an electrically-conductive fluid 4, such as ion-containing water, a mixture of water and glycol, or other suitable fluid, flows through flow passage 3 and through the magnetic field 8, an electromotive force (emf) is induced which can be measured by a circuitry 11 using the electrodes 7. The emf is proportional to the velocity of the fluid 4. Thus, the flow rate of the fluid 4 can be determined.

First Electrode Assembly 121

Figure 2:
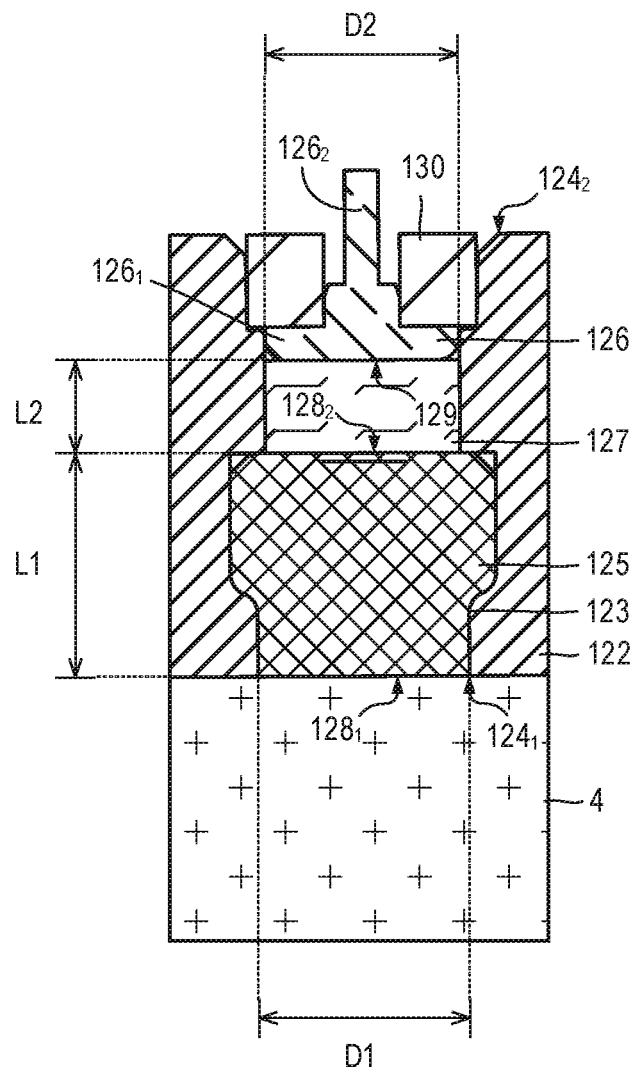
FIG. 2 is a cross-sectional view of an electrode assembly which includes a housing, an electrode, a polymer piece (or "electrically-conductive polymer connector") which serves as a seal and an interconnect, a further connector (or "pin") and a retainer.

Referring to FIG. 2, an electrode assembly 121 for use in the electromagnetic flow meter 1 (FIG. 1) is shown.

The electrode assembly 121 comprises a housing 122, which in this case takes the form of the flow tube 2 (FIG. 1), having a passage 123 between first and second ends $124_1$, $124_2$. In other words, the passage 123 extends through the wall of the flow tube 2 (FIG. 1) and the first end $124_1$ opens to the inside of the flow tube 2 (FIG. 1). The wall of the flow tube 2 may extend outwardly to provide a neck (or "tower") to accommodate the electrode assembly 121.

The electrode assembly 121 comprises an electrode 125 (for providing the electrode 9 in FIG. 1) in the form of a porous graphite plug (which may also be referred to as a "piece" or "block"), disposed within the passage 123 proximate the first end $124_1$ of the passage 123. The electrode 125 is generally cylindrical and has a front face diameter $D_1$ of about 4 mm and a length $L_1$ of about 5 to 10 mm. An inner section of the electrode 125 (i.e., the section proximate the first end of the passage) has a slightly smaller diameter than an outer section.

The electrode assembly 121 further comprises a first connector 126 (or "terminal") in the form of a metal pin, disposed within the passage proximate the second end of the passage 123 and an electrically-conductive polymer connector 127 (also referred to as an "electrically-conductive polymer seal") disposed within the passage 123, interposed between the electrode 125 and the first connector 126 (which may also be referred to as a "further connector"). The further connector 126 may be made from brass or other relatively inexpensive conductive metal, such as copper, or metal alloy, but may have a surface coating of gold. The further connector 126 may be made from a conductive polymer. The electrically-conductive polymer seal 127 may be formed from an elastomer, such as silicone or ethylene propylene diene monomer (EPDM) rubber loaded, with particles of electrically-conductive material, such as carbon (for example, in the form of carbon black or carbon nanotubes) or silver (for example, in the form of silver flakes).

The electrically-conductive polymer seal 127 is arranged to electrically connect the electrode 125 and pin 126 and to provide a fluid-tight seal in the passage between the electrode 125 and pin 126. The seal 127 is generally disc-shaped, having a diameter $D_2$ of about 4 mm and a length $L_2$ of about 3 mm.

The further connector 126 includes a disc portion $126_1$ and a rod portion $126_2$ upstanding from the center of the disc portion $126_1$ extending towards the second end $124_2$ of the passage 123. The electrically-conductive polymer seal 127 is compressed between an outwardly-facing face $128_2$ of the electrode 125 and an inwardly-facing face 129 of the further connector 126. A retainer 130 may be used to maintain physical contact between the electrode 125 and pin 126. The electrode assembly 121 is formed by insert moulding of the electrode 125.

The electrically-conductive polymer seal 127 is in direct electrical contact with the graphite electrode 125 and is in direct electrical contact with the further connector 126.

In use, an inwardly-facing face $128_1$ (or "front face") of the porous graphite electrode 125 is presented to the fluid 4. The fluid 4 permeates throughout the porous graphite electrode 125 to make a good electrical contact with the large surface area provided by the porous graphite electrode 125 and the fluid 4 may reach the electrically-conductive polymer seal 127. The fluid 4 is in good electrical contact with the large area provided by the porous graphite electrode 125 and the conductive polymer seal 127 make good electrical contact with the porous graphite electrode 125.

Using a graphite electrode 125 can help to reduce the cost of the flow meter while maintaining performance. Furthermore, the electrode assembly can be used in a very low-conductivity fluid (e.g., <20 $\mu Sm^{-1}$). Moreover, an 'O'-ring need not be used to prevent fluid from reaching metrology electronics in the register (not shown).

Second Electrode Assembly 221

Figures 3A, 3B, 3C:
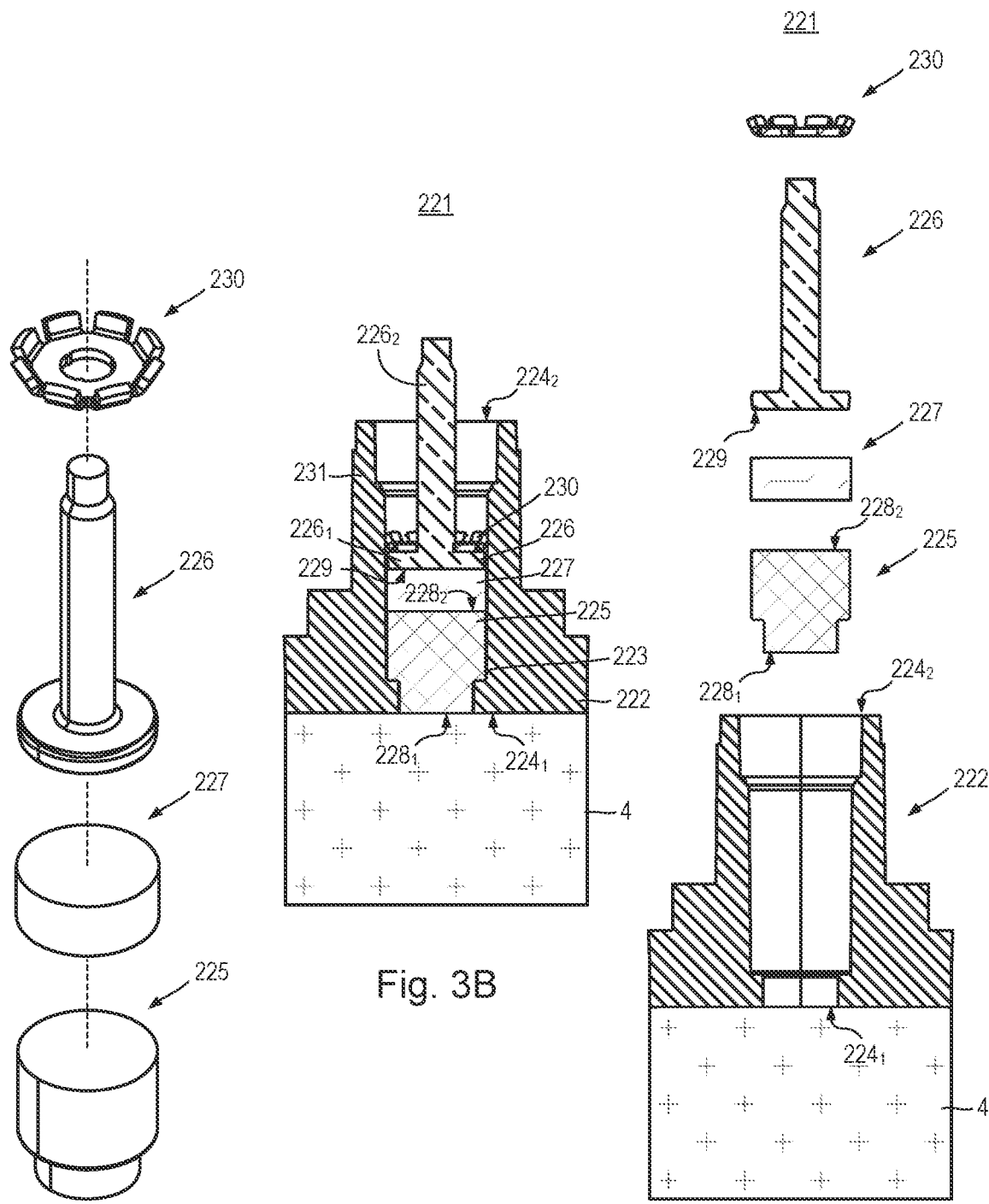
FIGS. 3A, 3B and 3C are exploded perspective, cross-sectional and exploded cross-sectional views, respectively of an electrode assembly which includes a housing, an electrode, a polymer piece which serves as a seal and an interconnect, a further connector and a retainer, which is assembled in a housing.

Referring to FIGS. 3A to 3C, an electrode assembly 221 for use in the electromagnetic flow meter 1 (FIG. 1) is shown.

The electrode assembly 221 comprises a housing 222, which in this case takes the form of the flow tube 2 (FIG. 1), having a passage 223 between first and second ends $224_1$, $224_2$. In other words, the passage 223 extends through the wall of the flow tube 2 (FIG. 1) and the first end $224_1$ opens to the inside of the flow tube 2 (FIG. 1).

The electrode assembly 221 comprises an electrode 225 in the form of a porous graphite plug, disposed within the passage 223 proximate the first end $224_1$ of the passage 223. The electrode 225 is generally cylindrical and has a front face diameter of about 4 mm and a length of about 5 to 10 mm. An inner section of the electrode 225 (i.e., the section proximate the first end of the passage) has a slightly smaller diameter than an outer section, and thus allows the electrode assembly to assembled after the housing 222 (i.e., flow tube) has been moulded.

The electrode assembly 221 further comprises a first connector 226 in the form of a metal pin, disposed within the passage 223 proximate the second end of the passage 223 and an electrically-conductive polymer connector 227 (also referred to as an "electrically-conductive polymer seal") disposed within the passage 223, interposed between the electrode 225 and pin 226. The first connector 226 (or "further connector") may be made from brass or other relatively inexpensive conductive metal or metal alloy. The further connector 226 may be made from a conductive polymer. The electrically-conductive polymer seal 227 may be formed from an elastomer, such as silicone or ethylene propylene diene monomer (EPDM) rubber loaded, with particles of electrically-conductive material, such as carbon (for example, in the form of carbon black or carbon nanotubes) or silver (for example, in the form of silver flakes).

The electrically-conductive polymer seal 227 is arranged to electrically connect the electrode 225 and pin 226 and to provide a fluid-tight seal in the passage between the electrode 225 and pin 226. The seal 227 is generally disc-shaped, having a diameter of about 4 mm and a length of about 3 mm.

The further connector 226 includes a disc portion $226_1$ and a rod portion $226_2$ upstanding from the centre of the disc portion $226_1$ extending towards the second end $224_2$ of the passage 223. The electrically-conductive polymer seal 227 is compressed between an outwardly-facing face $228_2$ of the electrode 225 and an inwardly-facing face 229 of the further connector 226.

A retainer 230, in this case in the form of a starlock washer, may be used to maintain physical contact between the electrode 225, seal 227 and further connector 226. The electrode assembly 221 is assembled after the housing 222 (i.e., flow tube) has been moulded.

The wall of the flow tube 2 may extend outwardly to provide a neck 231 to accommodate the electrode assembly 221.

The electrically-conductive polymer seal 227 is in direct electrical contact with the graphite electrode 225 and is in direct electrical contact with the further connector 226.

In use, an inwardly-facing face $228_1$ (or "front face") of the porous graphite electrode 225 is presented to the fluid 4.

The fluid 4 permeates throughout the porous graphite electrode 225 and may reach the electrically-conductive polymer seal 227.

The fluid 4 is in good electrical contact with the large area provided by the porous graphite electrode and the conductive polymer seal 127 make good electrical contact with the porous graphite electrode 225.

Using a graphite electrode can help to reduce the cost of the flow meter while maintaining performance. Furthermore, the assembly can be used in a very low-conductivity fluid (e.g., <20 μSm$^{-1}$). Moreover, an 'O'-ring need not be used to prevent fluid from reaching metrology electronics in the register (not shown).

Third Electrode Assembly 321

Figures 4A, 4B, 4C:
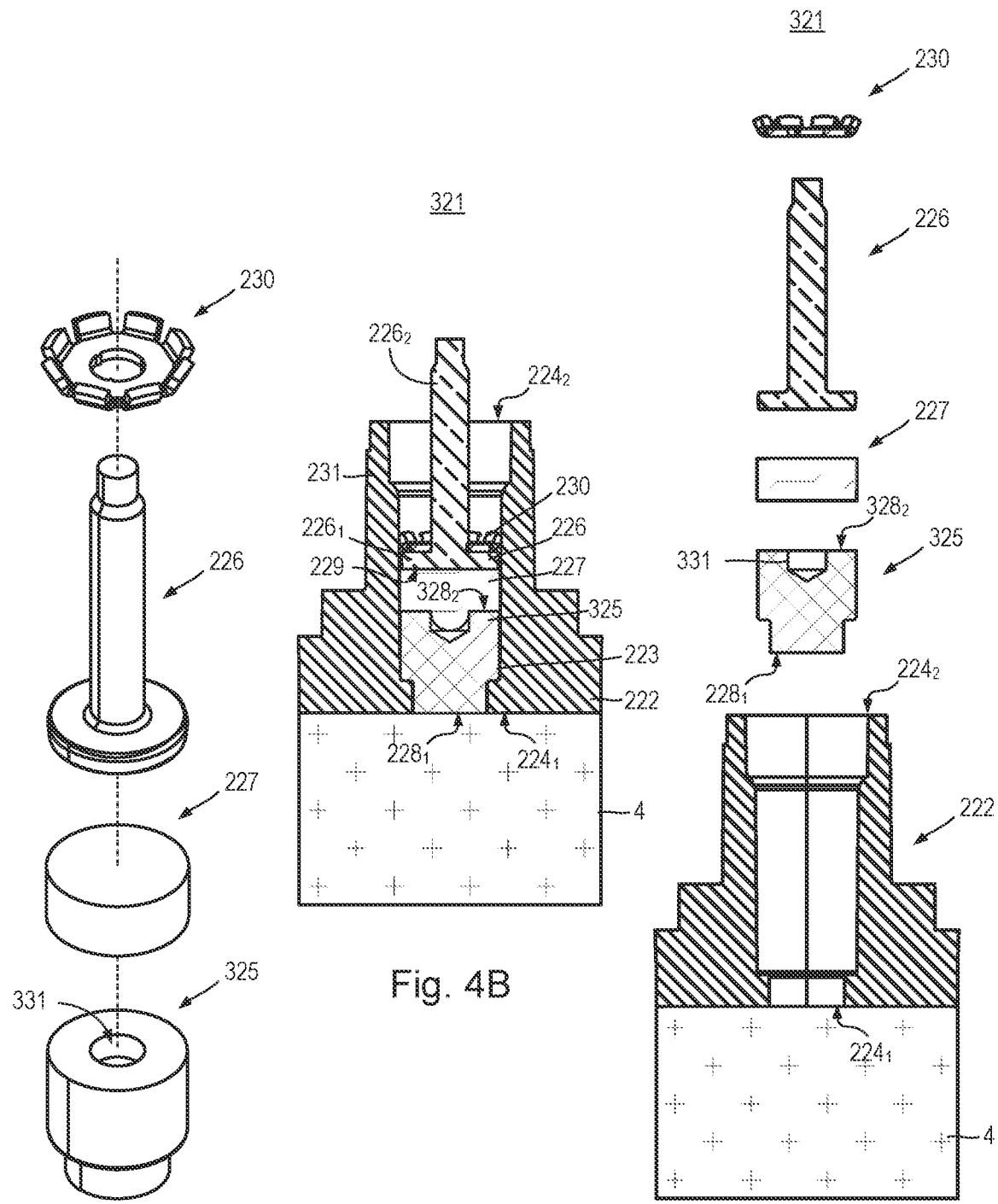
FIGS. 4A, 4B and 4C are exploded perspective, cross-sectional and exploded cross-sectional views, respectively of a third electrode assembly which includes a housing, an electrode which includes a central blind hole a polymer piece which serves as a seal and an interconnect, a further connector and a retainer, wherein the central blind hole can help to increase seal compression exerted between the bore of the housing and the seal.

Referring to FIGS. 4A to 4C, a third electrode assembly 321 for use in the electromagnetic flow meter 1 (FIG. 1) is shown.

The third electrode assembly 321 is the same as the electrode assembly 221 (FIGS. 3A to 3C) except that the electrode 325 has a blind-hole 331 in the centre of its outwardly-facing face $328_2$. The electrode 325 may have a through-hole instead of a blind-hole. This can help to increase compression of the seal 227. The addition of the blind hole 331 in the electrode 325 provides more sealing compression or sealing band pressure between the seal 227 and the inside passage 223 (or "bore") for a given axial force applied by the further connector 226.

This can help to increase sealing band pressure between the inside of the passage 223 (or "bore") and the seal 227, thus enabling operation at potentially higher water pressures.

Other parts of the third electrode assembly 321 are the same as those of the electrode assembly 221 (FIG. 3) and so will not be described again. Like parts are denoted by like reference numerals.

Fourth Electrode Assembly 421

Figures 5A, 5B, 5C:
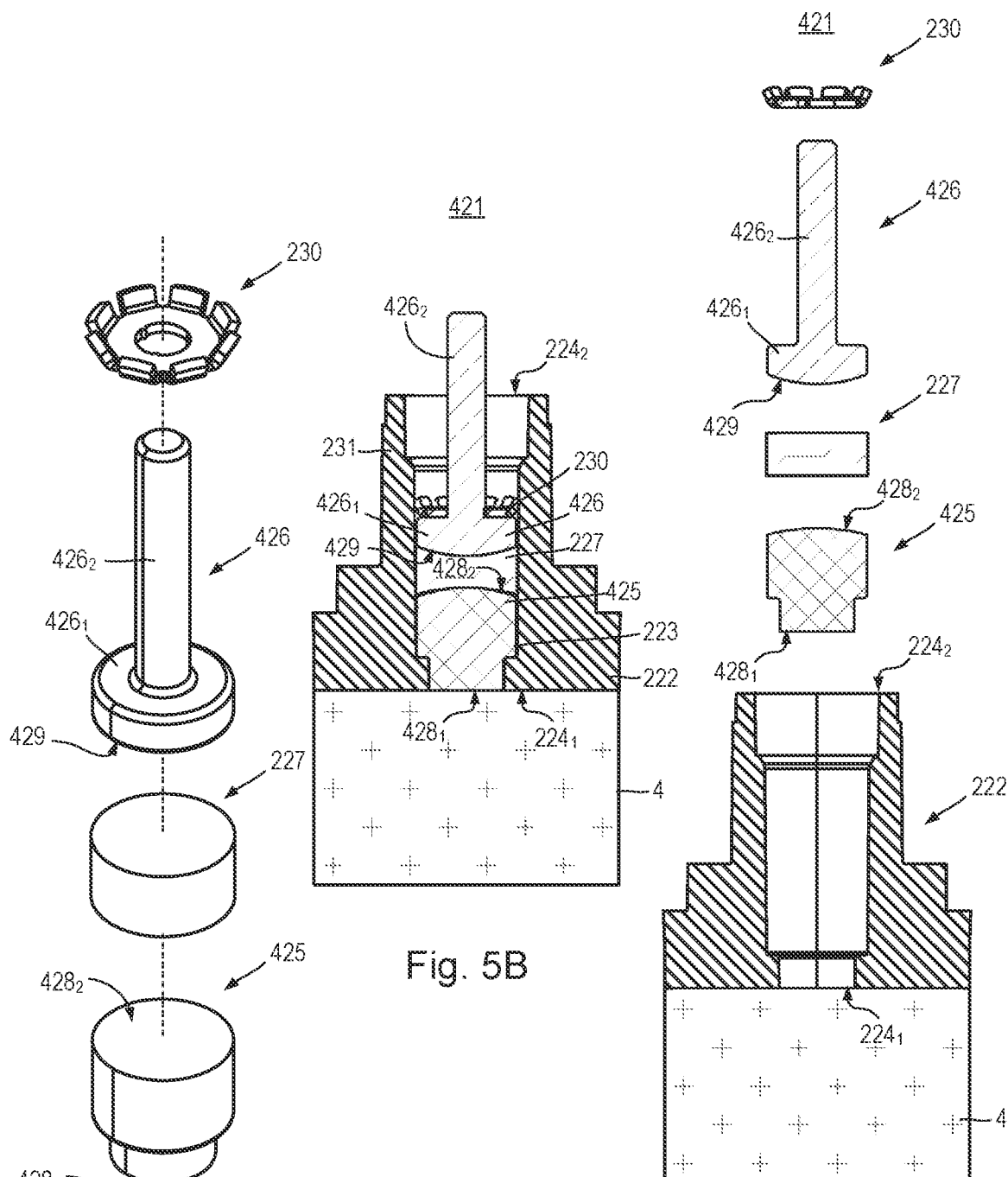
FIGS. 5A, 5B and 5C are exploded perspective, cross-sectional and exploded cross-sectional views, respectively of a fourth electrode assembly which includes a housing, an electrode which has a convex upper face, a polymer piece which serves as a seal and an interconnect, a further connector having a convex lower face and a retainer, wherein the convex faces can help to promote sealing.

Referring to FIGS. 5A to 5C, a fourth electrode assembly 421 for use in the electromagnetic flow meter 1 (FIG. 1) is shown.

The fourth electrode assembly 421 is the same as the electrode assembly 221 (FIGS. 3A to 3C) except that an outwardly-facing face $428_2$ of the electrode 425 and the inwardly-facing face 429 of the disc portion $426_1$ of the further connector 426 are dome-shaped (or "convex"). This can help to increase compression of the seal 227.

The inwardly-facing face $428_1$ of the electrode 425 is the same as the inwardly-facing face $228_1$ (FIG. 3) of the electrode 225 (FIG. 3) of the electrode assembly 221 (FIG. 3). Similarly, the rod portion $426_2$ of the further connector 426 is the same as the rod portion $226_2$ (FIG. 3) of the further connector 226 (FIG. 3) of the electrode assembly 221 (FIG. 3).

Other parts of the fourth electrode assembly 421 are the same as those of the electrode assembly 221 (FIG. 3) and so will not be described again. Like parts are denoted by like reference numerals.

Fifth Electrode Assembly 521

Referring to FIGS. 6A to 6C, a fifth electrode assembly 521 for use in the electromagnetic flow meter 1 (FIG. 1) is shown.

The fifth electrode assembly 521 is the same as the electrode assembly 221 (FIGS. 3A to 3C) except that it includes a plug-like further connector 526 which is arranged to be seated in a cup-shaped seal 527 which includes a blind-hole 533 for accommodating a distal end portion $526_1$ of the further connector 526 and which includes inner and outer circumferential ribs 535, 536 and inner and outer central protrusions 537, 538. This can help to provide a radial seal.

Other parts of the fifth electrode assembly 521 are the same as those of the electrode assembly 221 (FIG. 3) and so will not be described again. Like parts are denoted by like reference numerals.

Sixth Electrode Assembly 621

Figures 7A, 7B, 7C:
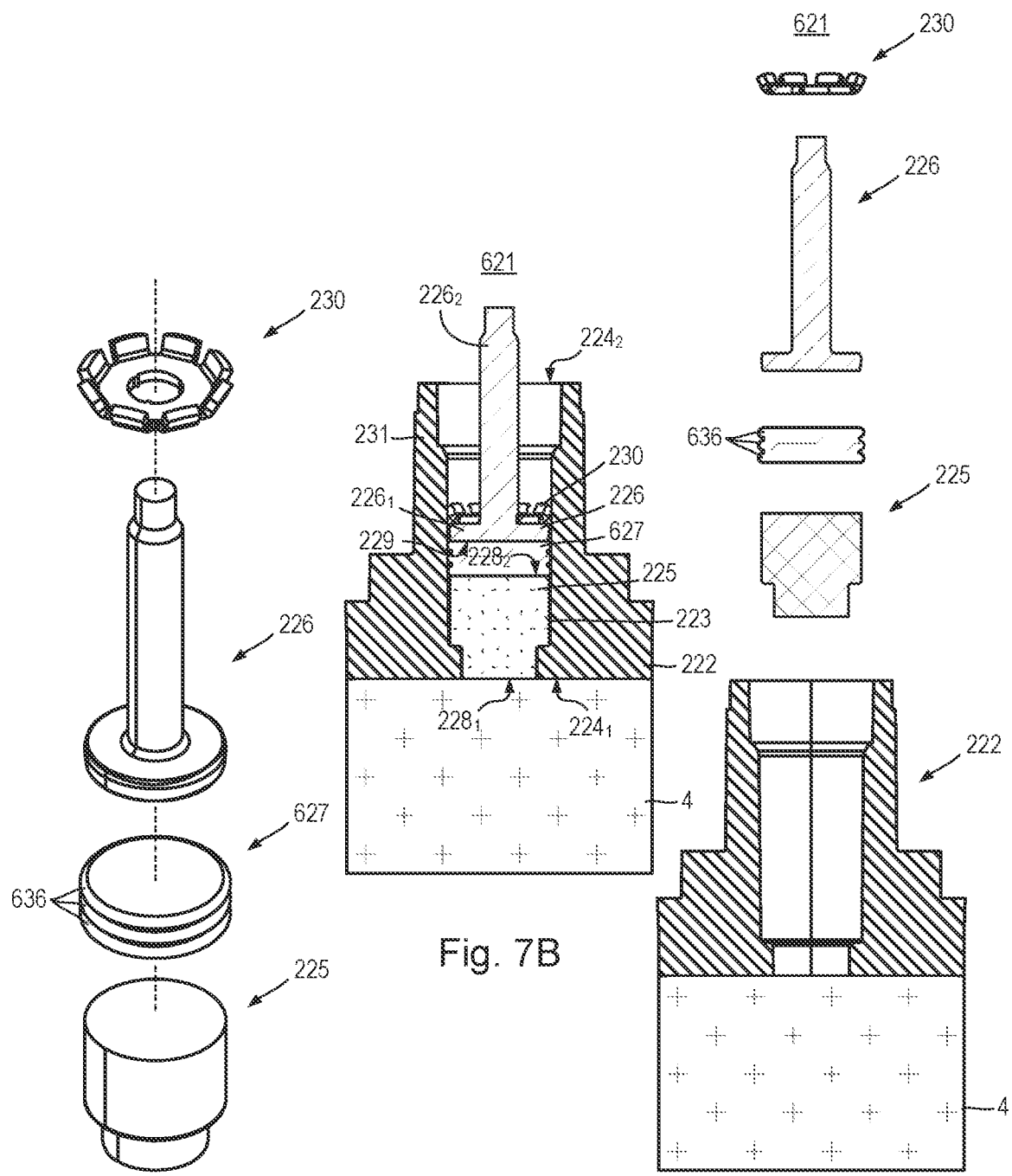
FIGS. 7A, 7B and 7C are exploded perspective, cross-sectional and exploded cross-sectional views, respectively of a sixth electrode assembly which includes a housing, an electrode, a polymer piece which serves as a seal and an interconnect having three outer circumferential ribs, a further connector and a retainer.

Referring to FIGS. 7A to 7C, a sixth electrode assembly 621 for use in the electromagnetic flow meter 1 (FIG. 1) is shown.

The sixth electrode assembly 621 is the same as the electrode assembly 221 (FIGS. 3A to 3C) except that the seal 627 includes three outer circumferential ribs 636 (or "lobes") spaced apart in the direction of the passage. This can help to provide a radial seal.

Other parts of the sixth electrode assembly 621 are the same as those of the electrode assembly 221 (FIG. 3) and so will not be described again. Like parts are denoted by like reference numerals.

Seventh Electrode Assembly 721

Figure 8A:
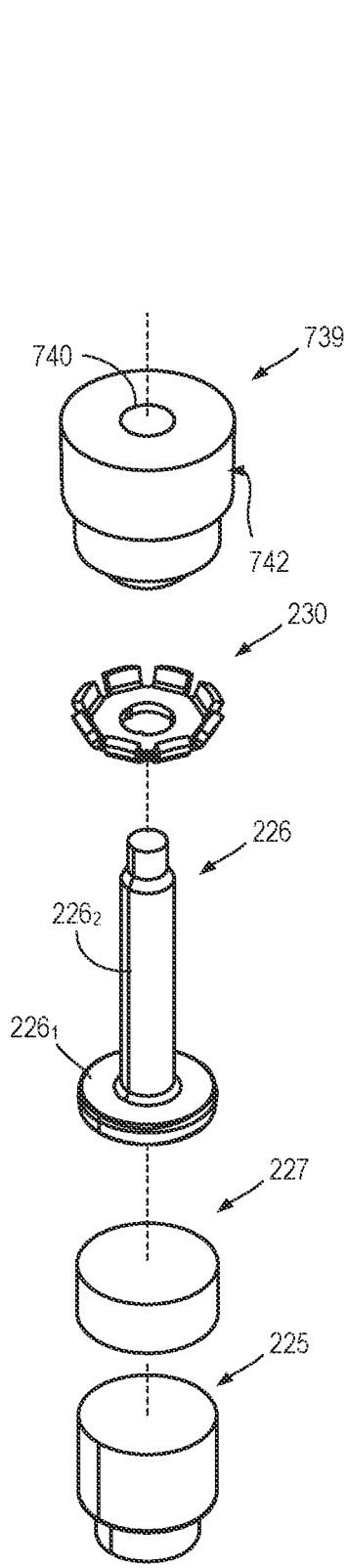
FIGS. 8A, 8B and 8C are exploded perspective, cross-sectional and exploded cross-sectional views, respectively of a seventh electrode assembly which includes a housing, an electrode, a polymer piece which serves as a seal and an interconnect, a connector, a retainer, and a sleeve for holding the pin.
Figure 8B:
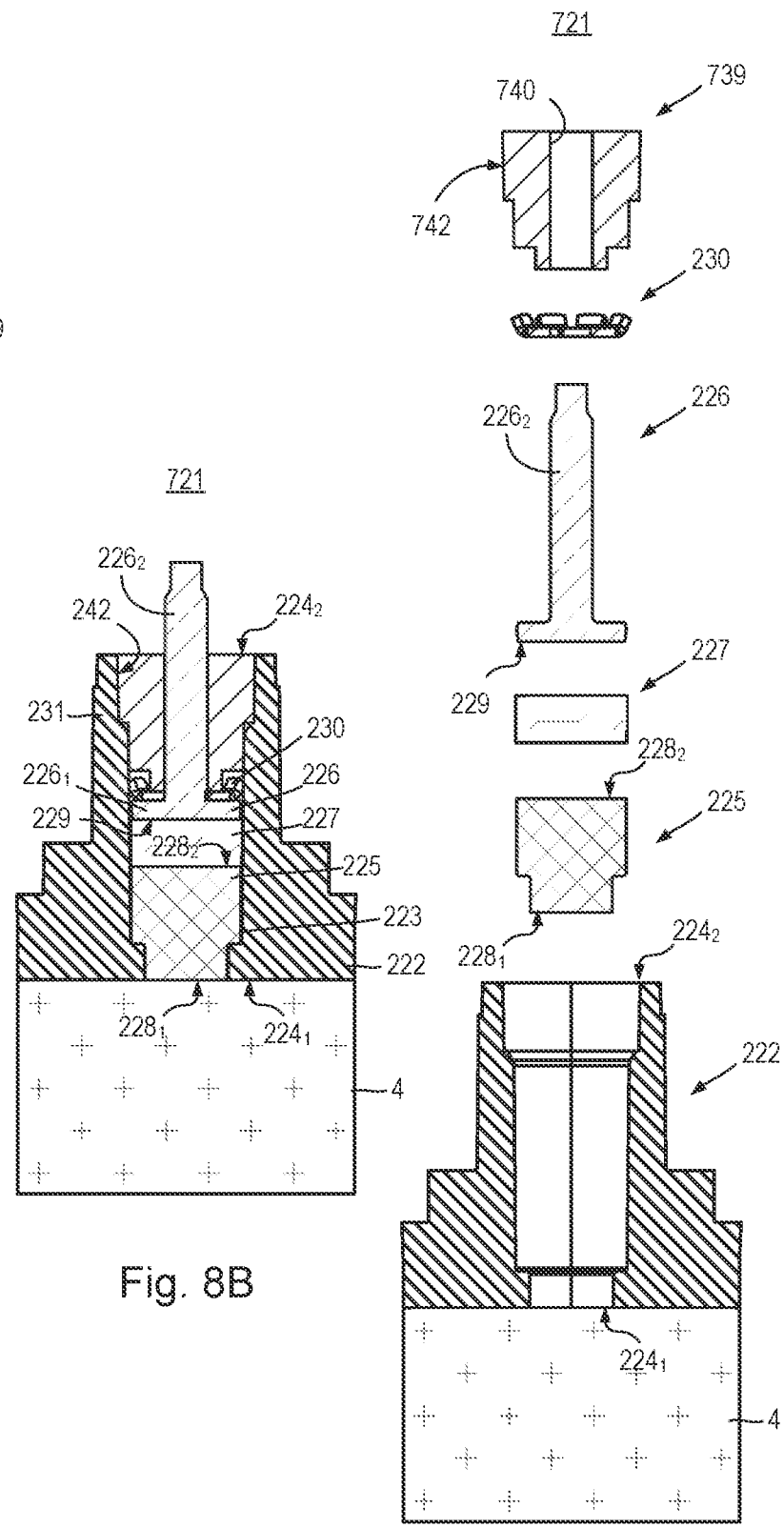
Figure 8C:
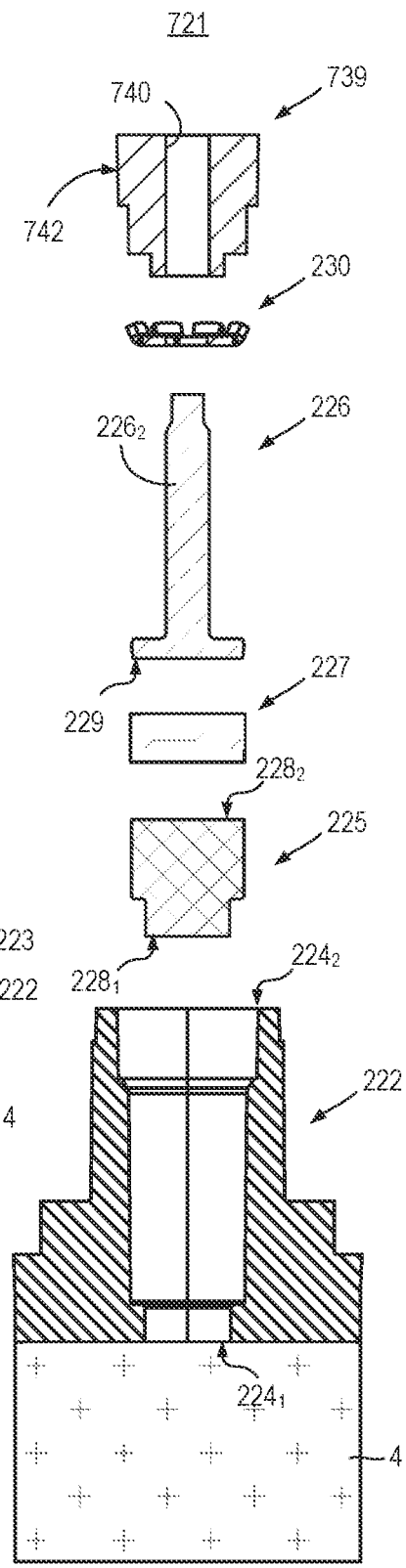
Figure 9C:
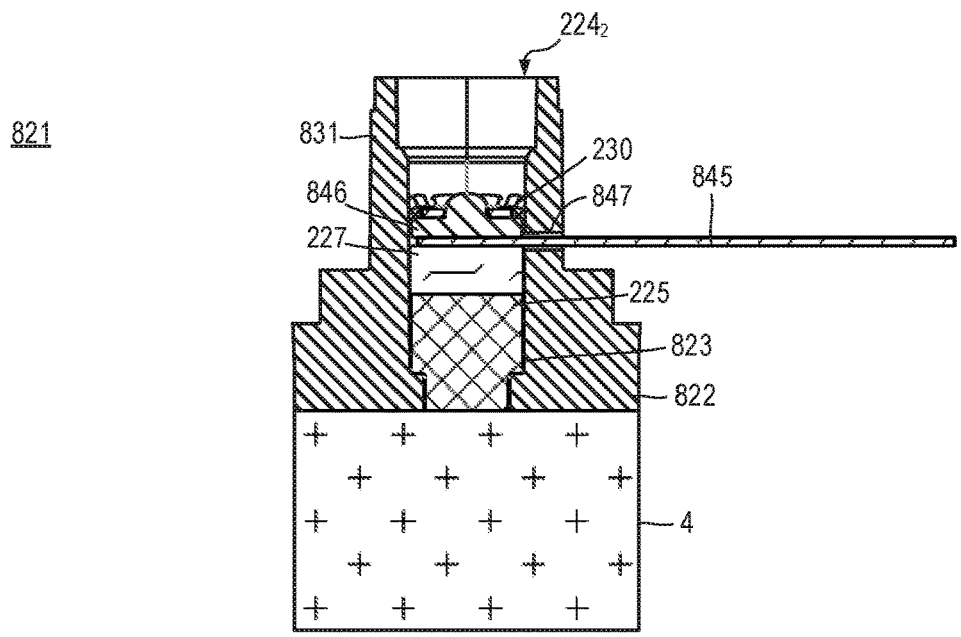
FIGS. 9A, 9B, 9C and 9D are perspective, exploded perspective, cross-sectional and exploded cross-sectional views, respectively of an eighth electrode assembly which includes a housing, an electrode, a polymer piece which serves as a seal and an interconnect, a connector provided by a flexible circuit, a backing plug and a retainer.
Figure 9B:
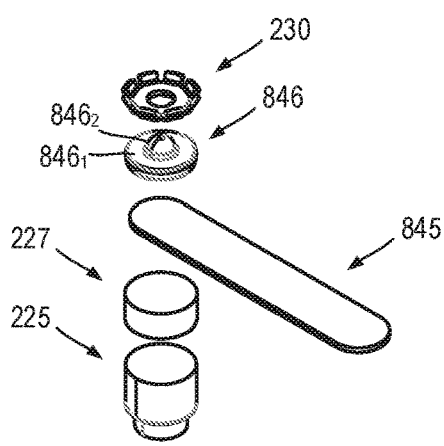
Figure 9A:
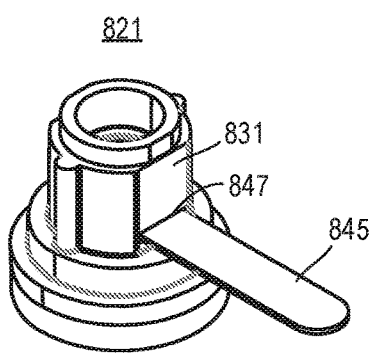
Figure 9D:
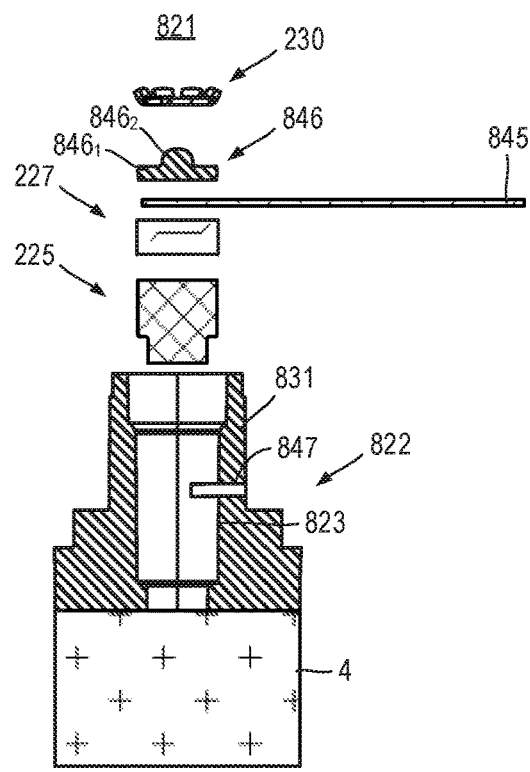

Referring to FIGS. 8A to 8C, a seventh electrode assembly 721 for use in the electromagnetic flow meter 1 (FIG. 1) is shown.

The seventh electrode assembly 721 is the same as the electrode assembly 221 (FIGS. 3A to 3C) except that it includes an additional sleeve 739 for providing mechanical radial and/or axial stability to the pin 226 (i.e., the connector).

The starlock washer 230 may be omitted. When the sleeve 739 is used without the starlock washer 230, it provides force for compressing the seal. The sleeve 739 may be retained by weld(s) (using ultrasonic or thermal welding) or an adhesive.

The sleeve 739 includes a through hole 740 (or "bore") having slightly larger diameter as the outer diameter of the rod portion $226_1$ of the further connector 226. The sleeve 739 includes a stepped outer surface 742 which corresponds to the stepped inner surface 242 of the passage 223.

The other parts of the electrode assembly 721 are the same as those of the electrode assembly 221 (FIG. 3) and so will not be described again. Like parts are denoted by like reference numerals.

Eighth Electrode Assembly 821

Referring to FIGS. 9A to 9D, an eighth electrode assembly 821 for use in the electromagnetic flow meter 1 (FIG. 1) is shown.

The eighth electrode assembly 821 is the same as the electrode assembly 221 (FIGS. 3A to 3C) except that the connector is provided by a flexible printed circuit sheet 845 which is sandwiched between the seal 227 and a holding disc 846 which may be formed from electrically-insulating material. The flexible printed circuit sheet 845 passes through a slot 847 in the side wall of the neck 831 of the housing 822 through which the passage 823 passes.

The flexible printed circuit sheet 845 comprises a flexible electrically-insulating substrate formed from a suitable plastic, such as polyester, polyimide or PEEK, and one or more tracks (not shown) of metal or electrically-conductive polymer on the seal-facing face of the substrate.

The holding disc 846 comprises a main, flat portion $846_1$ and a central boss $846_2$ (or "stub") which can help positioning of the starlock washer 230.

Other parts of the eighth electrode assembly 821 are the same as those of the electrode assembly 221 (FIG. 3) and so are not described again. Like parts are denoted by like reference numerals.

Ninth Electrode Assembly 921

Referring to FIGS. 10A to 10C, a ninth electrode assembly 921 for use in the electromagnetic flow meter 1 (FIG. 1) is shown.

The ninth electrode assembly 921 is the same as the electrode assembly 221 (FIGS. 3A to 3C) except that a flexible printed circuit sheet 855 is additionally provided which is connected to the further connector 226. A conductive washer 956 having a flat face 957 and a conical face 958 can be used to help provide a larger area of attachment (e.g., by soldering) for the flexible printed circuit sheet 855 to the top $226_3$ of the further connector 226. The flexible printed circuit sheet 855 may be attached to the further connector 226 using conductive adhesive 956.

The flexible printed circuit sheet 855 comprises a flexible electrically-insulating substrate formed from a suitable plastic, such as polyester, polyimide or PEEK, and one or more tracks (not shown) of metal or electrically-conductive polymer on the seal-facing face of the substrate.

The further connector 226 may be formed of brass and may be gold-coated. However, the further connector 226 may formed of electrically-conductive polymer. If the further connector 226 is formed of an electrically-conductive polymer, then the seal 227 may be omitted and, thus, the connector 226 may directly contact the electrode 225 provided another seal is used elsewhere. In this arrangement, the further connector 226 is referred to as an "electrically-conductive polymer connector".

Other parts of the ninth electrode assembly 921 are the same as those of the electrode assembly 221 (FIG. 3) and so are not described again. Like parts are denoted by like reference numerals.

Tenth Electrode Assembly 1021

Figures 11A, 11B, 11C:
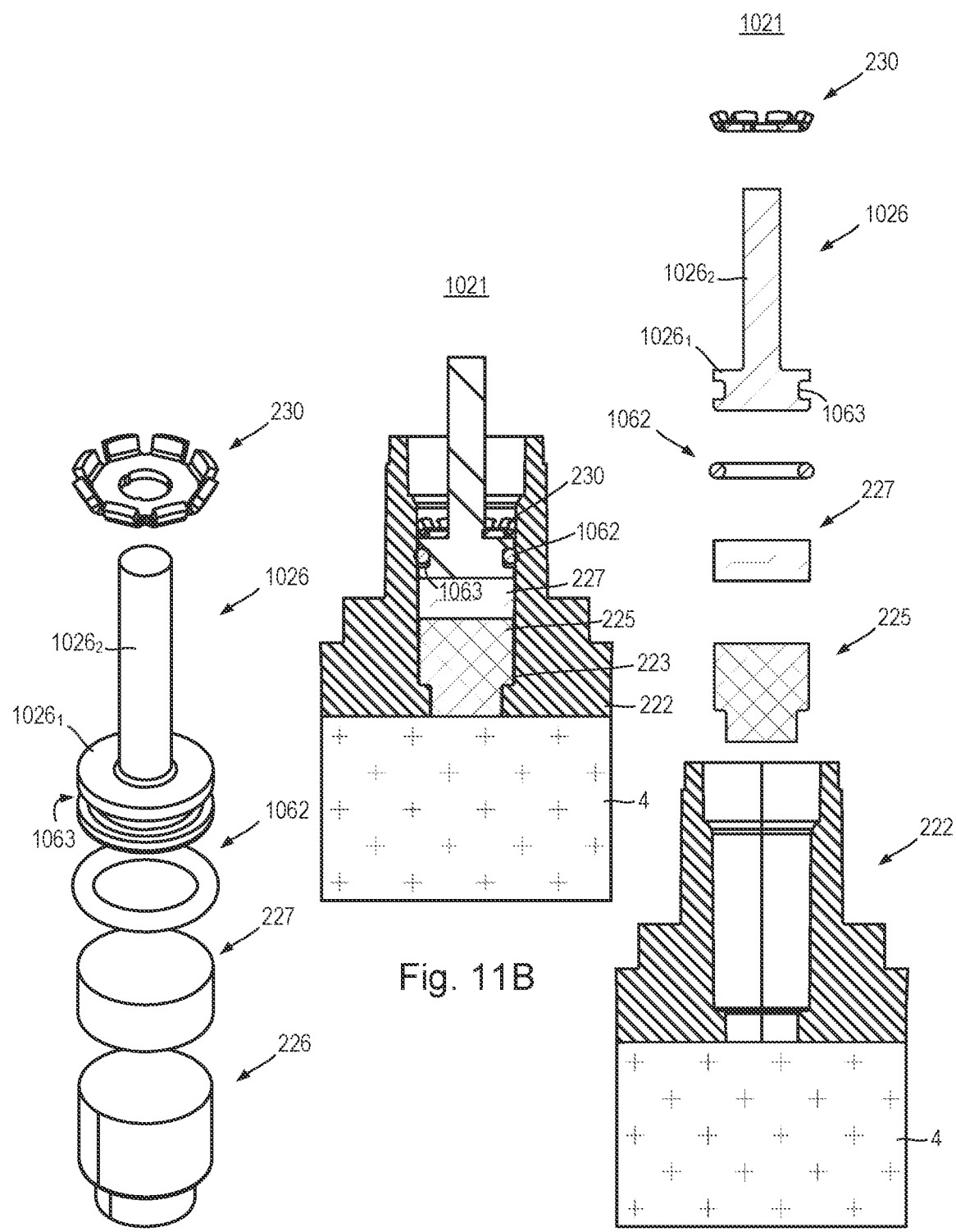
FIGS. 11A, 11B, and 11C are exploded perspective, cross-sectional and exploded cross-sectional views, respectively of a tenth electrode assembly which includes a housing, an electrode, a polymer piece which serves as an interconnect, a further connector in the form of a metal or conductive plastic or metal pin having a circumferential groove, an 'O'-ring which sits in the circumferential groove or a gland formed between the top of the pin's flange and the bottom of the retainer, and a retainer, wherein the pin directly loads the polymer piece or the graphite electrode if the conductive elastomer is omitted.

Referring to FIGS. 11A to 11C, a tenth electrode assembly 1021 for use in the electromagnetic flow meter 1 (FIG. 1) is shown.

The tenth electrode assembly 1021 is the same as the electrode assembly 221 (FIGS. 3A to 3C) except that a further connector 1026 is used which accommodates an 'O'-ring 1062 in a circumferential groove 1063 around the disc portion $1026_1$. A rod portion $1026_2$ extends away from the center of the disc portion $1026_1$.

The further connector 1026 may be formed of brass and may be gold-coated. However, the further connector 1026 may formed of an electrically-conductive polymer. If the further connector 1026 is formed of electrically-conductive polymer, then the seal 227 may be omitted and, thus, the connector 1026 may directly contact the electrode 225. In this arrangement, the connector 1026 is referred to as an "electrically-conductive polymer connector".

Other parts of the tenth electrode assembly 1021 are the same as those of the electrode assembly 221 (FIG. 3) and so are not described again. Like parts are denoted by like reference numerals.

Eleventh Electrode Assembly 1121

Figures 12A, 12B, 12C:
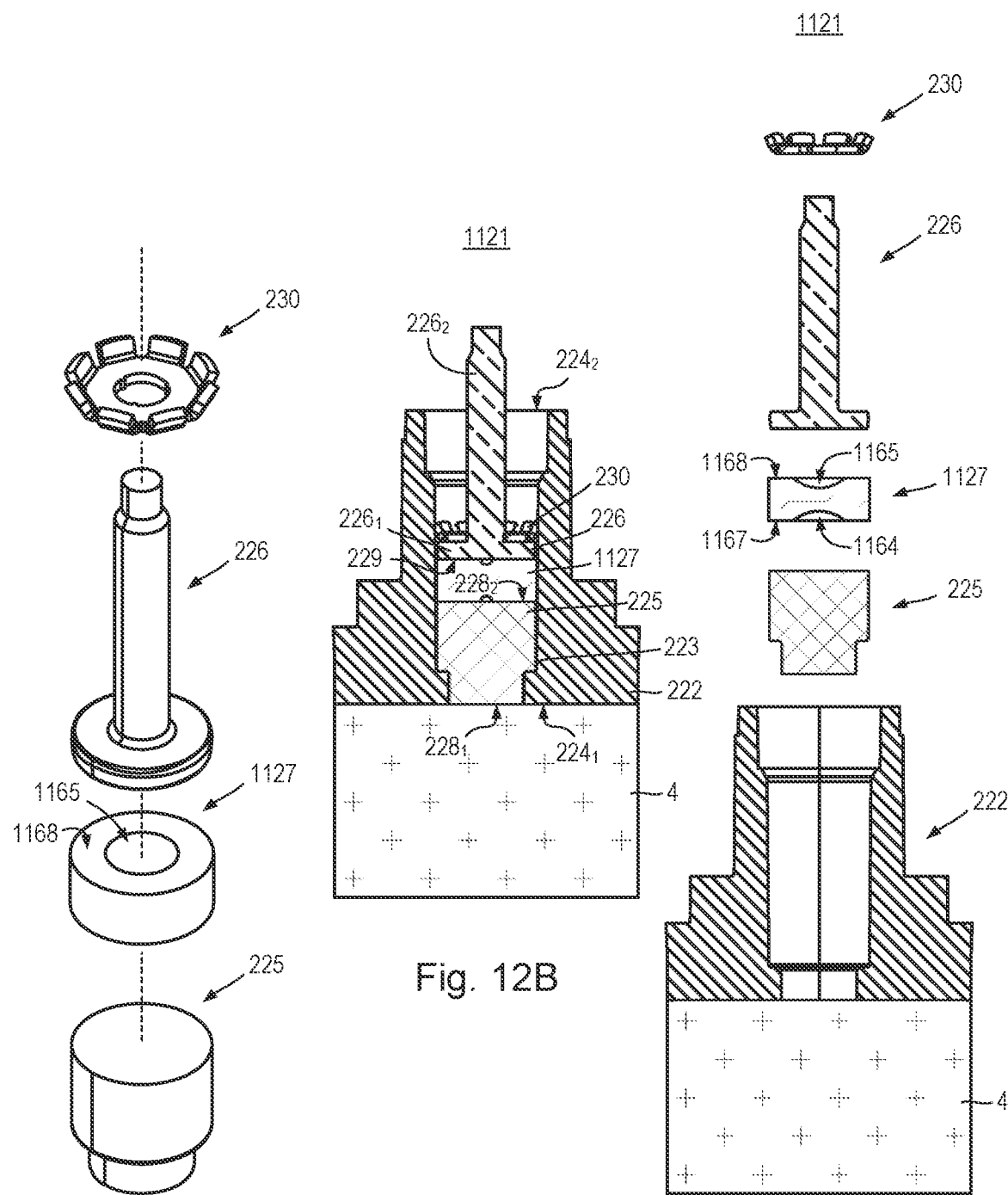
FIGS. 12A, 12B, and 12C are exploded perspective, cross-sectional and exploded cross-sectional views, respectively of an eleventh electrode assembly which includes a housing, an electrode, a polymer piece which serves as a seal and an interconnect and which includes central concave portions (or "indentations") on bottom and upper faces, a further connector and a retainer, wherein the indentations can help to increase sealing pressure between the bore and the seal.

Referring to FIGS. 12A to 12C, an eleventh electrode assembly 1121 for use in the electromagnetic flow meter 1 (FIG. 1) is shown.

The eleventh electrode assembly 1121 is the same as the electrode assembly 221 (FIGS. 3A to 3C) except that an electrically-conductive polymer connector 1127 (also referred to as an "electrically-conductive polymer seal") is used which has central blind holes 1164, 1165 (or "indentations") in inwardly- and outwardly-facing faces 1167, 1168, respectively. This can help to increase sealing band pressure between the inside of the passage 223 (or "bore") and the seal 1127, thus enabling operation at potentially higher water pressures.

Other parts of the eleventh electrode assembly 1121 are the same as those of the electrode assembly 221 (FIG. 3) and so are not described again. Like parts are denoted by like reference numerals.

Twelfth Electrode Assembly 1221

Figure 13:
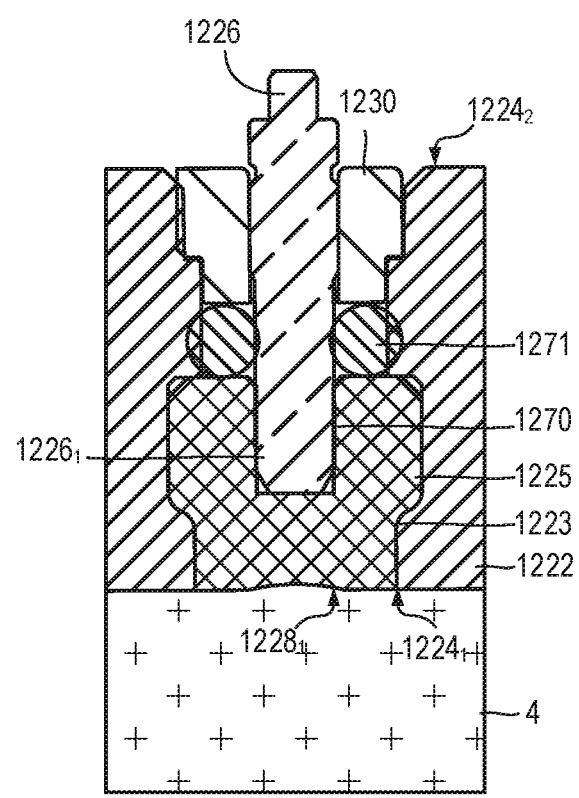
FIG. 13 is cross-sectional view of a twelfth electrode assembly comprising a housing, an electrode, an electrically-conductive polymer connector in the form of a conductive plastic through pin touching the electrode, an 'O'-ring and a retainer.

Referring to FIG. 13, a twelfth electrode assembly 1221 for use in the electromagnetic flow meter 1 (FIG. 1) is shown.

The electrode assembly 1221 comprises a housing 1222, which in this case takes the form of the flow tube 2 (FIG. 1), having a passage 1223 between first and second ends $1224_1$, $1224_2$. In other words, the passage 1223 extends through the wall of the flow tube 2 (FIG. 1) and the first end $1224_1$ opens to the inside of the flow tube 2 (FIG. 1).

The electrode assembly 1221 comprises an electrode 1225 in the form of a porous graphite plug, disposed within the passage 1223 proximate the first end $1224_1$ of the passage 1223. The electrode 1225 is generally cup-shaped and has a front face diameter of about 4 mm and a length of about 5 to 10 mm. An inner section of the electrode 1225 (i.e., the section proximate the first end of the passage) has a slightly smaller diameter than an outer section, although it can be larger. The electrode 1225 may be insert moulded or inserted after the housing is moulded.

The electrically-conductive polymer connector 1226 is formed from a rigid, electrically-conductive polymer which is loaded with particles of electrically-conductive material, such as carbon (for example, in the form of carbon black or carbon nanotubes) or silver (for example, in the form of silver flakes).

The plug-like electrically-conductive polymer connector 1226 is arranged to be seated in the cup-shaped electrode 1225 which includes a blind-hole 1270 for accommodating a distal end portion $1226_1$ of the electrically-conductive polymer connector 1226. The plug-like connector electrically-conductive polymer 1226 may be press-fitted into the cup-shaped electrode 1225. The electrode 1225 may have through-hole instead of a blind-hole.

The electrode assembly 1221 further comprises an 'O'-ring 1271 arranged around the shaft of the electrically-conductive polymer connector 1226. The 'O'-ring 1371 may comprise an electrically-insulating elastomer material or may comprise an electrically-conductive elastomer material, such as silicone or EPDM rubber, loaded with particles of electrically-conductive material, such as carbon (for example, in the form of carbon black or carbon nanotubes) or silver (for example, in the form of silver flakes).

A retainer 1230 may be used to maintain physical contact between the electrode 1225, and the electrically-conductive polymer connector 1226. The electrode assembly 1221 is formed by insert moulding.

In use, an inwardly-facing face $1228_1$ (or "front face") of the porous graphite electrode 1225 is presented to the fluid 4. The fluid 4 permeates throughout electrode 1225 to make a good electrical contact with the large surface area provided by the porous graphite electrode 1225 and the fluid 4 may reach the electrically-conductive polymer connector 1226.

Using a graphite electrode 1225 can help to reduce the cost of the flow meter. Furthermore, the electrode assembly can be used in a very low-conductivity fluid (e.g., <20 $\mu Sm^{-1}$).

Thirteenth Electrode Assembly 1321

Figure 14:
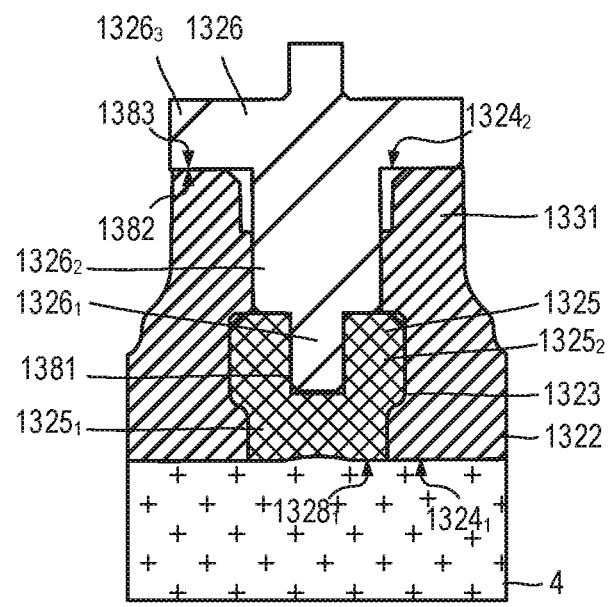
FIG. 14 is cross-sectional view of a thirteenth electrode assembly comprising a housing, an electrode, an electrically-conductive polymer connector in the form of a conductive plastic through pin touching the electrode having a flange which forms a face seal.

Referring to FIG. 14, a thirteenth electrode assembly 1321 for use in the electromagnetic flow meter 1 (FIG. 1) is shown.

The electrode assembly 1321 comprises a housing 1322, which in this case takes the form of the flow tube 2 (FIG. 1), having a passage 1323 between first and second ends $1324_1$, $1324_2$. In other words, the passage 1323 extends through the wall of the flow tube 2 (FIG. 1) and the first end $1324_1$ opens to the inside of the flow tube 2 (FIG. 1).

The electrode assembly 1321 comprises an electrode 1325 in the form of a porous graphite plug, disposed within the passage 1323 proximate the first end $1324_1$ of the passage 1323. The electrode 1325 is generally cup-shaped and has a front face diameter of about 4 mm and a length of about 5 to 10 mm. An inner section $1325_1$ of the electrode 1325 (i.e., the section proximate the first end of the passage) has a slightly smaller diameter than an outer section $1325_2$, although it can be larger. The electrode 1325 may be insert moulded or inserted after the housing is moulded. The electrode 1325 includes a central blind hole 1381. The electrode 1325 may have a through-hole instead of a blind hole.

The electrode assembly 1321 further comprises a plug-like electrically-conductive polymer connector 1326 in the form of a headed, electrically-conductive polymer pin having first, second and third sections $1326_1$, $1326_2$, $1326_3$. The first and second sections $1326_1$, $1326_2$ are disposed within the passage 1323. The third section $1326_3$ provides a head which is generally wider than the passage 1323.

An inward-facing surface 1382 (or "underside") of the third section $1326_3$ and an outward-facing surface 1383 (or "upper surface") of the neck 1331 of the housing 1322 are correspondingly shaped and are arranged to form an annular face seal, e.g., using ultrasonic welding, adhesive etc. An 'O'-ring need not be used. A radial seal may be formed by ultrasonic welding, for example, between the second section $1326_2$ of the electrically-conductive polymer connector 1326 and the housing neck 1331.

The electrically-conductive polymer connector 1326 is formed from a rigid, electrically-conductive polymer which is loaded with particles of electrically-conductive material, such as carbon (for example, in the form of carbon black or carbon nanotubes) or silver (for example, in the form of silver flakes).

The first section $1326_1$ of the electrically-conductive polymer connector 1326 is arranged to be seated in the blind-hole 1381 of the cup-shaped electrode 1325. The electrically-conductive polymer connector 1326 may be press-fitted into the cup-shaped electrode 1325.

In use, an inwardly-facing face $1328_1$ (or "front face") of the porous graphite electrode 1325 is presented to the fluid 4. The fluid 4 permeates throughout electrode 1325 to make a good electrical contact with the large surface area provided by the porous graphite electrode 1325 and the fluid 4 may reach the electrically-conductive polymer connector 1326.

Using a graphite electrode 1325 can help to reduce the cost of the flow meter. Furthermore, the electrode assembly can be used in a very low-conductivity fluid (e.g., <20 μSm$^{-1}$).

Fourteenth Electrode Assembly 1421

Figure 15:
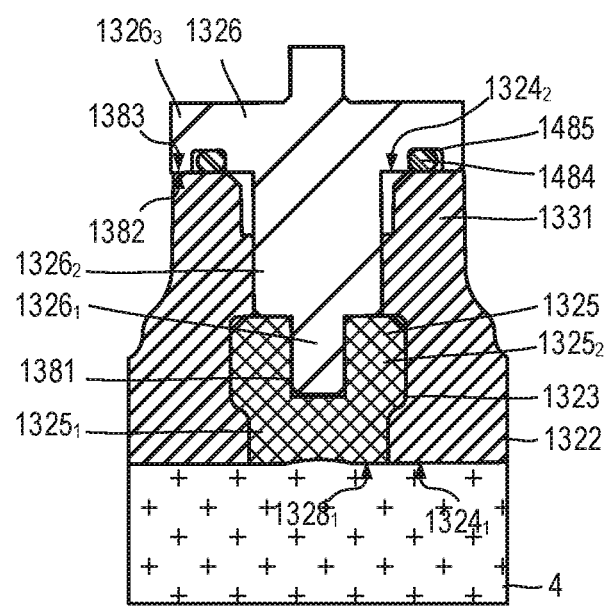
FIG. 15 is cross-sectional view of a fourteenth electrode assembly comprising a housing, an electrode, an electrically-conductive polymer connector in the form of a conductive plastic through pin touching the electrode, having a flange and an 'O'-ring which forms a face seal.

Referring to FIG. 15, a fourteenth electrode assembly 1421 for use in the electromagnetic flow meter 1 (FIG. 1) is shown.

The fourteenth electrode assembly 1421 is the same as the thirteenth electrode assembly 1321 (FIG. 14) except that an 'O' ring 1484 is used and is disposed in an annular groove 1485 within the third section $1326_3$ of the electrically-conductive polymer connector 1326. A radial weld may be formed by ultrasonic welding for example between the second section $1326_2$ of the electrically-conductive polymer connector 1326 and the neck 1331 of the housing 1322.

Other parts of the fourteenth electrode assembly 1421 are the same as those of the thirteenth electrode assembly 1321 (FIG. 14) and so are not described again. Like parts are denoted by like reference numerals.

Porosity of the Electrode

In the embodiments herein described, the electrode may be formed from porous graphite.

Figure 16:
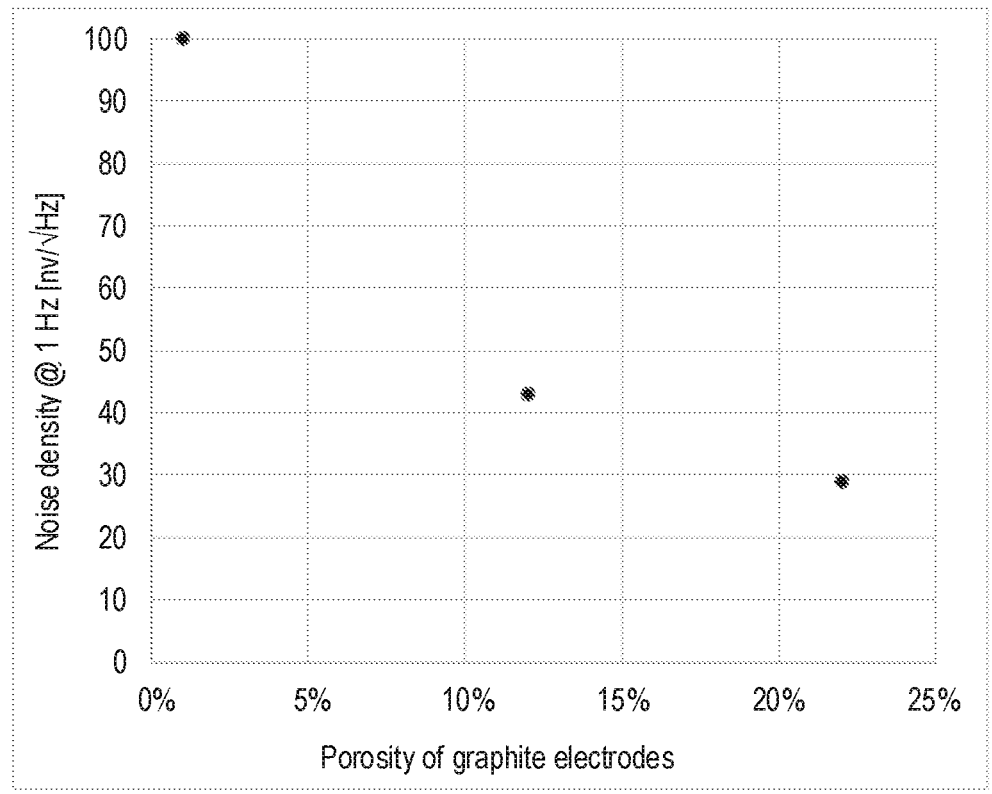
FIG. 16 is a plot of noise density exhibited by a pair of electrodes at 1 Hz plotted against the porosity of the pair of graphite electrodes.

Referring to FIG. 16, a plot of measured noise density exhibited by a pair of electrodes at 1 Hz plotted as a function of the porosity of the pair of graphite electrodes is shown.

Spectral voltage noise density is measured using a PC-based data-acquisition system (not shown) in combination with an ultra-low-noise pre-amplifier (not shown). The electrode terminals are connected to the differential inputs of the preamplifier, which applies a gain of too to the voltage between the terminals, such that it can be readily digitized by the DAQ system with sufficient resolution. Using Welch's method, the spectral noise density is calculated from the acquired time-series. The results for 1 Hz are plotted in FIG. 16.

The intrinsic noise density of the pre-amplifier and acquisition system is sufficiently low that its contribution to the measured noise density for the electrode pairs can be neglected.

FIG. 16 shows that noise generally decreases as porosity of the graphite electrode increases.

Volume of the Electrode

Figure 17:
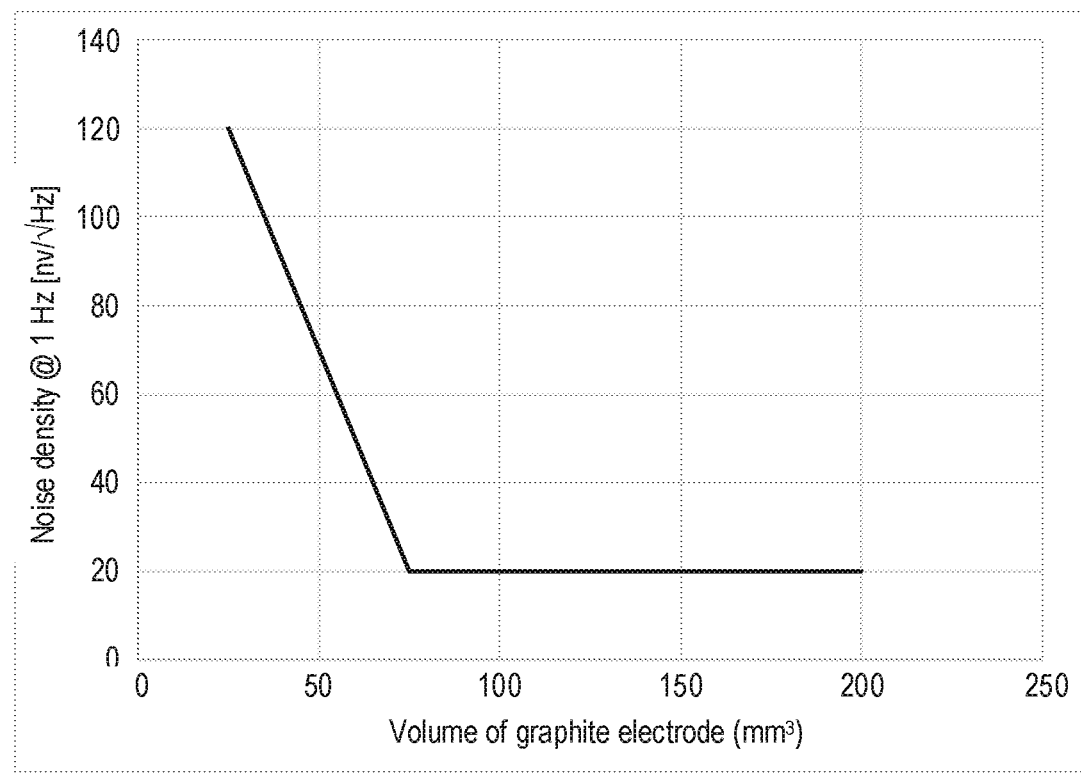
FIG. 17 is a plot of the noise density exhibited by a pair of electrodes at 1 Hz plotted against the volume of each of the graphite electrodes.

Referring to FIG. 17, a plot of the noise density exhibited by a pair of electrodes at 1 Hz plotted as a function of the volume of the individual graphite electrode is shown.

FIG. 17 shows that noise density decreases as the volume of the graphite electrode increases. In the example shown, the noise density decreases substantially when the electrode volume increases above 20 mm$^3$.

Reducing the magnitude of the noise density of the electrodes is important at it is superimposed on the measured emf that is proportional to the flow velocity. Thus, a lower noise density reduces the time required to average-out any noise when taking a flow measurement. Therefore, a flowmeter with a large turn down ratio (e.g., 800 or higher) becomes viable to calibrate and use. In addition, it makes flowmeters with lower turn down ratios (e.g., 250 or lower) faster to calibrate in production and so lowers the productions cost.

The noise density of a pair of electrodes at 1 Hz can be less than or equal to 90 nV/sqrt(Hz), or less than or equal 60 nV/sqrt(Hz), or less than or equal 30 nV/sqrt(Hz). The noise density of a pair of electrodes at 1 Hz can be greater than or equal to 5 nV/sqrt(Hz).

MODIFICATIONS

It will be appreciated that various modifications may be made to the embodiments hereinbefore described. Such modifications may involve equivalent and other features which are already known in the design, manufacture and use of electromagnetic flow meters and component parts thereof and which may be used instead of or in addition to features already described herein. Features of one embodiment may be replaced or supplemented by features of another embodiment.

Features of one embodiment may be used in another, different embodiment and vice versa, and modifications made to one embodiment can be made to another, different embodiment.

The electrodes herein described may have multiple holes and/or through holes and/or blind holes, and may be molded into a housing and/or a flowtube or may be assembled into to a housing and/or a flowtube.

The connector may be formed of electrically-conductive polymer. If the connector is formed of an electrically-conductive polymer, then the electrically-conductive seal may be omitted and, thus, the connector may be in direct contact with the electrode.

A separate retainer need not be used. For example, the connector may include a retaining feature, such as threads or barbs.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An electrode assembly for an electromagnetic flow meter, the electrode assembly comprising:
   a housing having a passage between first and second ends;
   an electrode comprising a plug of porous material at least partially disposed within the passage proximate the first end; and
   an electrically-conductive polymer connector at least partially disposed within the passage and in direct contact with the electrode.

2. The electrode assembly of claim 1, wherein the electrode comprises or is formed from graphite.

3. The electrode assembly of claim 1, wherein the electrically-conductive polymer connector is an electrically-conductive polymer seal disposed within the passage, interposed between the electrode and a further connector, and is arranged to electrically connect the electrode and the further connector and to provide a fluid-tight seal in the passage between the electrode and the further connector.

4. The electrode assembly of claim 3, wherein the further connector comprises or is predominantly formed of electrically-conductive polymer or a non-noble metal, for example, copper, or an alloy comprising a non-noble metal, such as brass.

5. The electrode assembly of claim 1, wherein the electrically-conductive polymer connector is at least partially disposed within the passage in direct electrical contact with the electrode, wherein the assembly further comprises:
   a seal, a weld and/or a bond line to provide a fluid-tight seal between the first end of the passage and a non-wetted section of the flow meter.

6. The electrode assembly of claim 1, wherein the electrically-conductive polymer connector comprises or is predominantly formed from an elastomer.

7. The electrode assembly of claim 1, wherein the electrically-conductive polymer connector abuts the electrode and/or is compressed and/or is compressed against the electrode.

8. The electrode assembly of claim 1, wherein the electrically-conductive polymer connector is arranged to withstand a pressure of at least 6.5 MPa.

9. The electrode assembly of claim 1, wherein the electrically-conductive polymer connector comprises or is predominantly formed from silicone.

10. The electrode assembly of claim 1, wherein the electrically-conductive polymer connector comprises particles of electrically-conductive material.

11. The electrode assembly of claim 10, wherein the electrically-conductive material is carbon.

12. The electrode assembly of claim 1, wherein the electrically-conductive polymer connector comprises carbon black.

13. The electrode assembly of claim 1, wherein the electrically-conductive polymer connector is seated in the electrode.

14. An electromagnetic flow meter comprising:
   a flow tube having a flow passage;
   first and second electrode assemblies disposed on opposite sides of the flow tube, each of the first and second electrode assemblies respectively comprising the electrode assembly of claim 1, and the first and second electrode assemblies arranged such that respective electrodes are in fluid communication with the flow passage; and
   a magnetic field source for providing a magnetic field across the flow passage between the electrodes.

15. The electromagnetic flow meter of claim 14, wherein the flow tube provides respective housings for the first and second electrode assemblies.

16. The electromagnetic flow meter of claim 14, wherein the magnetic field source comprises:
   a length of remanent magnetic material; and
   a coil wound around at least a portion of the length of remanent magnetic material.

17. The electromagnetic flow meter of claim 14, further comprising:
   circuitry connected directly or indirectly to the electrically-conductive polymer connectors arranged to perform a flow measurement.

18. The electrode assembly of claim 1, further comprising:
   a further connector,
   wherein the electrically-conductive polymer connector is disposed within the passage interposed between the electrode and the further connector and is arranged to electrically connect the electrode and the further connector.

19. The electrode assembly of claim 18, wherein the further connector comprises or is predominantly formed of a non-noble metal or an alloy comprising a non-noble metal.

20. The electrode assembly of claim 18, further comprising:
   a seal to provide a fluid-tight seal between the first and second ends of the passage.

21. The electrode assembly of claim 5, wherein the seal, the weld and/or the bond line is/are arranged to withstand a pressure of at least 6.5 MPa.

22. The electromagnetic flow meter of claim 14, further comprising:
   circuitry connected directly or indirectly to further connectors arranged to perform a flow measurement.

23. The electromagnetic flow meter of claim 1, further comprising:

an annular ring to provide a fluid-tight radial seal between the first and second ends of the passage.

24. The electromagnetic flow meter of claim 23, wherein the annular ring comprises an 'O'-ring.

25. The electromagnetic flow meter of claim 23, wherein the annular ring comprises outer circumferential ribs spaced apart in the direction of the passage.

26. The electromagnetic flow meter of claim 1, wherein the electrically-conductive polymer connector is rigid.

27. The electromagnetic flow meter of claim 1, wherein the electrically-conductive polymer connector provides a fluid-tight seal between the first and second ends of the passage.

* * * * *